July 9, 1968     R. J. RIEKE ET AL     3,391,569

RESPIRATION MONITOR CALIBRATOR

Filed July 7, 1966

INVENTOR.
RICHARD J. RIEKE
DUANE R. LANDIN
BY
Ralph D. Hohenfeldt
ATTORNEY

United States Patent Office 3,391,569
Patented July 9, 1968

3,391,569
RESPIRATION MONITOR CALIBRATOR
Richard J. Rieke, Brookfield, and Duane R. Landin, Milwaukee, Wis., assignors to General Electric Company, a corporation of New York
Filed July 7, 1966, Ser. No. 563,461
1 Claim. (Cl. 73—3)

ABSTRACT OF THE DISCLOSURE

The subject inhales and exhales through a cylinder in which there is a lightweight piston that is actuated back and forth by the breath. At one point in its movement, the piston interrupts a light beam which causes a photocell to produce a marker signal. Another marker signal is produced when the piston has displaced a given volume, such as 250 milliliters, at which time the light beam is restored. The marker signals are combined with the output of a respiration monitor that feeds a chart recorder. The gain of the monitor is adjusted until the ordinates of the two marks differ by one centimeter, in which case the monitor is calibrated to read 250 milliliters per centimeter.

---

This invention relates to a device and a system for calibrating a respiration monitor so that the latter may yield a real time indication of a subject's ventilation volumes in absolute units.

The invention may be employed with many types of respiration measuring systems and, by way of specific example, with the respiration monitor described in the co-pending application of R. J. Rieke, Ser. No. 491,753, filed Sept. 30, 1965, and assigned to the assignee of the instant application.

It is often desirable to monitor the rate, the tital volume, and the minute volume of a human subject's respiration in the course of medical studies during intensive and postoperative care periods, and when a subject is anesthetized during surgery. Tidal volume as used herein means the volume of air inspired or expired by a subject during a single breath. Minute volume means the total volume of air moved into the respiration system each minute. Preferred methods of monitoring these parameters are those which do not interfere with the normal breathing mechanism of the body nor with the function of apparatus such as that used on the face of the subject for administering oxygen or anesthetic during surgical procedures. These conditions dictate the use of indirect methods for measuring respiration. One method utilizes the fact that transthoracic impedance varies linearly with the changing volume of air in the thorax incidental to breathing and, as in the copending application cited above, these impedance variations are converted to corresponding voltage signals and recorded as an analog of either tidal or minute volume or both. Of course, the recorded signals represent nothing more than proportional volume changes, which is important information, but not as significant medically as knowing actual volume units which can be assessed in the light of the physical development and characteristics of any given subject.

In order to calibrate respiration monitoring apparatus in absolute units it has been necessary heretofore to compare the recorded tital volume analog signals with another recording obtained with a calibrated spirometer equipped with a potentiometric output, or to estimate volume units. However, these procedures are inconvenient, time consuming, and vulnerable to the usual inaccuracies that are incidental to testing with one system and measuring with another.

Accordingly, it is a general object of this invention to provide a device and a system for calibrating, in absolute volume units, apparatus that measures respiration indirectly.

Further objects are to provide a calibrating device: that is easy to make and use; that is compact and lightweight; that is versatile in the respect that, as a general rule, it is compatible with any type of respiration measurement that has an output of the voltage analog of tidal volume; that does not impede breathing significantly so as to affect the sensitivity or linearity of the parameter being calibrated; that develops its calibration signals in the midrange region or the region or greatest linearity in the breathing cycle; and, that is accurate over extremes of the air flow range encountered in breathing.

In general terms, the invention involves use of a positive displacement incremental respiration volume meter that generates one pair of voltage pulses for each inhalation and exhalation by a test subject who is breathing through it. The pulses in a pair are spaced in time by an amount that is equivalent to the flow time for a measured amount of air. For instance, a model for use with adults measures 250 milliliters and one for use with children measures 100 milliliters out of a breathing cycle, the tidal volume of which is about 500 milliliters for a resting adult and somewhat less for a child.

The voltage pulses marking out the time limits of the measured volume are fed into a mixer which combines them with the tidal volume signal for being recorded as a composite signal. Thus, a point or mark is made on the tidal volume signal for each pulse in a pair. The ordinate distance between these points on the tidal volume record represents the flow of 250 milliliters of air and the distance between the points along the abscissa represents the time required for that volume of air to flow. Hence, the gain of the tidal volume signal generator may be so adjusted that the markers or points are caused to occur exactly one centimeter apart from each other, as measured along the ordinate, in which case the recording is calibrated on the basis of 250 milliliters per centimeter. A few breaths by the subject is sufficient for making the calibration after which the incremental volume meter may be set aside while the monitor continues to measure tidal volume indirectly.

A more detailed description of a preferred embodiment of the invention will now be set forth in reference to the drawing in which.

Figure 1:
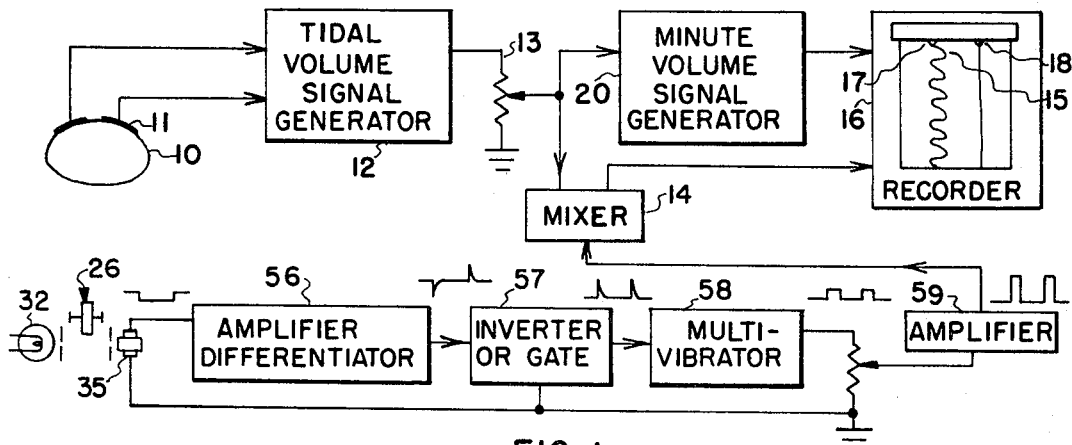
FIGURE 1 is a block diagram of a respiration monitoring system which incorporates the new calibrating system.
Figure 2:
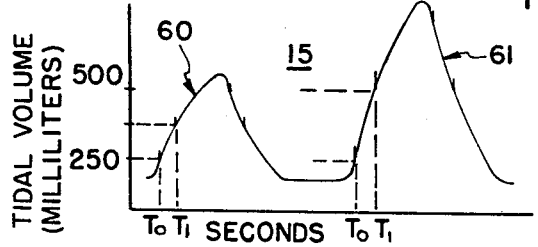
FIGURE 2 is a graph of a segment of the tidal volume signal as recorded.
Figure 4:
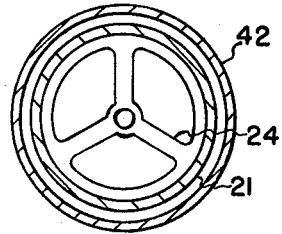
FIGURE 4 is a cross-section taken on the line 4—4 in FIGURE 3.

In FIGURE 1 the thoracic cavity of a subject whose respiratory volume is to be monitored is represented by the oval 10. A pair of electrodes 11 bear on the patient's chest for sensing impedance variations that accompany breathing. The impedance variations are used to modulate a tidal volume signal generator 12, the output of which is a voltage analog of tidal volume that appears on a potentiometer 13. The tidal volume signal waveform so produced is shown in FIGURE 2. This signal is fed through a mixer 14, the function of which will be described, and caused to appear in recorded form as an undulating line 15 on a chart recorder 16. The recorder may be a conventional oscillograph type with two writing pens 17 and 18.

The tidal volume signal on potentiometer 13 may be coupled to a minute volume signal generator 20. The latter is adapted to accumulate the tidal volume signals and it has a one minute time constant so that its output is a voltage analog of the average volume inhaled or exhaled by the subject on a per minute basis. In the absence of physiological changes, minute volume is relatively steady-state as suggested by the relatively straight line that is recorded by pen 18 in recorder 16.

As discussed earlier, for the recorded tidal volume signal to represent a unit of air volume per unit of pen deflection, it is necessary to calibrate the recorder by a method which does not impair the rhythmic impedance variations of the subject's thorax. How this is done will be explained initially by describing the incremental volume meter shown in FIGURE 3 and then referring back to FIGURE 1 to demonstrate how it is used in the system.

Figure 3:
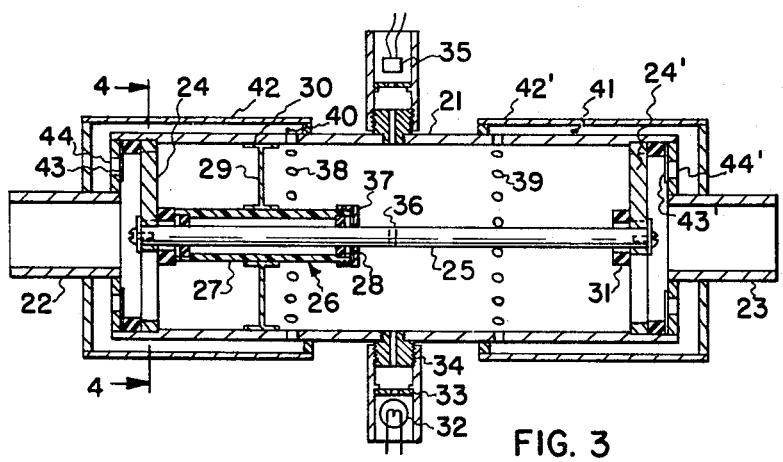
FIGURE 3 is a longitudinal sectional view taken through the new incremental volume meter.

The principle of the volume meter in FIGURE 3 is to let the patient's breath actuate a piston that interrupts a light beam at a time that corresponds with initiation of inspiring or expiring a measured volume and that restores the light beam at the end of the measured volume. For this purpose, there is provided an enclosure which in this case is a metal cylinder 21 that has at one end an air passageway in the form of a tubular extension which may lead to the subject and another tubular passageway 23 which leads to the atmosphere at the other end. Inside the cylinder and near each of its ends is a spoked ring or spider 24 across which a piston guide rod 25 is supported. Mounted for sliding axially on guide rod 25 is a piston assembly 26 which comprises a tube 27 of a lightweight material such as plastic. At opposite ends of tube 27 there are bearing inserts 28 which are held in place by an adhesive or press-fit and are made of a lightweight, low friction material such as Teflon to minimize friction when piston assembly 26 is propelled back and forth along guide rod 25 by reason of the subject inspiring and expiring air through the cylinder.

An imperforate piston ring 29 having an integral flanged periphery 30 encircles and is mounted tightly on tube 27. It is thus evident that if air is exhaled under pressure through tube 22 is will pass through the opening in spider 24 and force piston assembly 26 toward the opposite end of cylinder 21 as seen in FIGURE 3. Piston ring 29 and its flange 30 are made of a lightweight material such as aluminum or magnesium. The peripheral flange 30 makes a relatively loose fit with the interior wall of cylinder 21. Little air leaks through the interface between flange 30 and cylinder 21 despite the loose fit because the leakage path is relatively long and thus offers a high impedance to air flow. If desired, the piston may be lubricated with graphite powder on the external periphery of flange 30 or the interior of cylinder 21. In any event, the mass and friction of the piston assembly should be small enough as to not cause a force that opposes breathing or that would affect its linearity.

If air is exhaled from the subject through inlet tube 22, it flows through spider 24 and causes a force to be exerted on piston assembly 26 which projects the latter along guide rod 25 until it strikes a somewhat resilient limiting stop 31. Conversely, when the piston assembly 26 is at the far right, and air is inhaled by the subject through tube 22, fresh air will enter through tube 23 at the opposite end so as to cause the piston assembly to move back to its leftmost position as shown. When the piston makes these traverses, it makes and breaks a light beam that originates with a lamp 32 and projects diametrically across cylinder 21 to impinge on a photosensor or photovoltaic cell 35 which may be one of several known types but is preferably of the silicon type for maximum speed of response. The light beam is highly collimated by a perforated disk 33 and a small hole in a threaded plug 34 which screws into a tapped hole in the wall of cylinder 21. A similar threaded plug and perforated disk is shown for supporting the photocell 35 and collimating the beam that impinges on it. The light beam formed between source 32 and cell 35 may coincide with a chord of cylinder 21 or with a diameter in which case it is necessary to have a pinhole 36 through guide rod 25.

The output of cell 35 is a steady-state voltage that is reduced to essentially zero when the light beam is interrupted and returned to its former level when the light beam is restored on the cell. The voltage variations are square wave in form and are used in a manner that will be described below.

The adult model of the meter is so designed that piston 26 will displace exactly 250 milliliters of air during the interval between interruption and restoration of the light beam. To account for manufacturing tolerances that might affect the relationship between the displaced volume and the duration of light beam interruption, a threaded nut 37 may be provided for being turned in or out to shorten or lengthen the axial optical length of the piston assembly 26. In a commercial embodiment, manufacturing tolerances are held close enough so that nut 37 is omitted and deemed unnecessary in view of the inherent accuracy expected of a device of this type.

In order that air in excess of the increment of tidal volume that is being measured may discharge freely and not be blocked by the piston at the limit of its travel, the wall of cylinder 21 has two sets of circumferentially spaced holes 38 and 39 which communicate respectively with concentric chambers 40 and 41. Each of the chambers is defined by a cylindrical member such as 42 and 42' which are appropriately sealed by four end disks as shown. When piston assembly 26 begins movement to the right from its position in FIGURE 3, as a result of air being exhaled by the subject, no air flows through the path involving holes 38 and 39 because this is the closed direction for a flexible diaphragm valve 43 which covers an array of holes 44 in the end wall of cylinder 21. However, when the piston moves to the right, the air which it displaces may be relieved partly through holes 39 near the right end but primarily through the openings in the spider 24' at the right end, since this is the path of least impedance, and out through tube 23 which communicates with the atmosphere. As exhalation causes the piston to reach its right motion limit as determined by stop 31, continued exhalation air flow follows a path through holes 42' and 44' in the forward direction of valve 43'.

Since the impedance to air flow is greater through air chamber 40 or 41 than the impedance through cylinder 21 plus the impedance of piston 26 friction, the diaphragm valves 43 and 43' could be omitted. They are included as insurance against possible friction build up.

It will be seen that piston 26 must be set in motion and be moved a short distance before nut 37 interrupts the light beam by passing over hole 36 in guide rod 25. This means that the volume measurement taken for calibration is not initiated during the acceleration period of the piston assembly 26 so as to minimize the effect of piston inertia. Assuming that the piston is moving to the right from the position in which it is shown, it will eventually reach a position at which the trailing edge of plastic tube 27 will pass hole 36 and reestablish the light beam and the voltage pulse duration. This interruption of the light beam causes a voltage to be generated on the terminals of the photovoltaic cell 35. When the next inhalation occurs, low pressure is developed on the left side of piston 26 in cylinder 21 inwhich case the piston moves to the left and generates another square pulse having a time duration that corresponds with the time required to displace 250 milliliters of air. The switching of the air flow path for inhalation is accomplished in the same manner as described for exhalation but in the reverse direction.

Although the above described method for detecting the beginning and end of the time interval during which the incremental volume is displaced involves the use of a light source and a photosensor such as a photovoltaic cell, it should be understood that other methods of sensing or detecting the position of the piston means may be adopted within the purview of the invention. For instance, electric contacts, not shown, could be embedded in the wall of the cylinder so that the moving piston would make or break an electric circuit at each end of the incremental volume displacement by the piston in order to initiate generation of marker pulses. Any method that results in substantially no burden being imposed on movement of the piston or other moveable element may be satisfactory.

Figure 5:
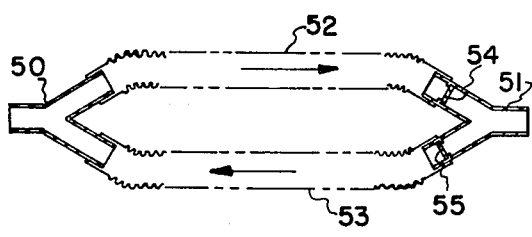
FIGURE 5 is a breathing tube assembly that is used in connection with practicing the invention.

To minimize the amount of stale air that a subject must breathe during the few breathing cycles that are needed to calibrate the respiration monitor, a two-path hose assembly such as that shown in FIGURE 5 is used. It comprises two Y-fittings 50 and 51 which are connected by flexible, noncollapsing hoses 52 and 53. Fitting 50 may be admitted to the patient's mouth or to a mouth fitting, not shown. Fitting 51, on the other hand may be coupled to tubular extension 22 on the meter of FIGURE 3. The branches of Y-fitting 51 are provided with check valves, the upper one 54 of which permits discharge of exhaled air in the direction of the arrow out through fitting 51 and to meter of FIGURE 3. The lower check valve 55 opens on inhalation to draw air through fitting 51 from the meter in the direction of the arrow in hose 53. In this manner the volume of the hose does not contribute to the volume of expired air reinhaled. The hose assembly, of course, avoids the need for having the subject place his mouth directly on inlet tube 22 of the meter and enables independent support of the meter at some distance from the subject's face.

Referring back to FIGURE 1, one may consider that 250 milliliters of piston displacement causes photovoltaic cell 35 to produce square wave pulse as indicated next to the cell which pulse begins when the light beam is interrupted and ends when the beam is restored. This pulse voltage is amplified and differentiated in amplifier-differentiator electronic device 56. The output of the differentiator 56 is a negative voltage spike that corresponds with interrruption of the light beam and a positive spike that corresponds with restoration of the light beam. The time interval between the spikes is equal to the time that it takes to displace the 250 milliliter calibration volume in the meter of FIGURE 3. There may be additional amplification stages, but for simplicity, the alternate positive and negative voltage spikes are passed into an inverter and diode logic OR gate 57 which has the property of generating consecutive positive output voltage spikes for each input voltage spike regardless of its polarity. The positive spikes are used to trigger a monostable multivibrator 58 which shapes the pulses and emits square wave pulses that are spaced apart over a time interval that corresponds with the interval of the input pulse spikes. The small square wave pulses may be feed into an amplifier 59 to increase their energy level after which they are delivered to a mixer 14.

Mixer 14 may, for example, be a summing circuit, or differential amplifier or any device that combines signals algebraically, with two inputs and a single-ended output. In this case, one of the inputs is the tidal volume signal from potentiometer 13 and the other is the square wave pulses from amplifier 59. The single output from mixer 14 controls the writing pen 17 which scribes the tidal volume curve on the paper in recorder 16. The tidal volume signal is recorded as usual whether or not the calibrator is in use. However, when the square wave pulses are fed into the mixer, there is a short deflection of the writing pen 17 which results in a mark being superimposed on the tidal volume graph upon occurrence of each pulse. As explained, the shape of the pulse has been generated so as to be consistent with the frequency response characteristic of pen 17.

The procedure for calibrating the respiration monitor for interpreting the tidal volume signals in terms of actual air volume units will now be described in connection with FIGURE 2. This figure shows two consecutive tidal volume signals of equal period as would be the case if a subject is breathing normally. The first tidal volume signal wave 60 may be considered as being recorded with the potentiometer 13 at a nonadjusted level, and hence, the gain of tidal volume signal generator set to produce a recorded signal having the amplitude of wave 60 as shown. Assume now that the subject is inhaling and exhaling through the meter shown in FIGURE 3. This produces marker signals which occur in time at the start and finish of a 250 milliliter air displacement. In FIGURE 2 the beginning and end of the interval occurring during inspiration are identified as $T_0$ and $_1$, respectively. During this interval, it will be seen in connection with curve 60 that the difference in the ordinate between $T_0$ and $T_1$ is supported to represent 250 milliliters, but it appears to represent about half that much on the chosen scale. For instance, it may be desired that 250 milliliters be represented by one centimeter on the graph.

To make the ordinate correspond with 250 milliliters between $T_0$ and $T_1$, one may adjust the gain of the tidal volume signal generator by adjusting potentiometer 13 so that the recorded signal corresponds in amplitude with that of curve 61 in FIGURE 2. Now, the horizontal broken lines that correspond to the ordinates of the marker pulses represent exactly 250 milliliters on the scale at the left and, if the ordinate difference is one centimeter, the tidal volume signal is calibrated in terms of 250 milliliters per centimeter.

After exact adjustment of the recorder for 250 milliliters per centimeter with a few breathing cycles of the subject who is to be monitored, the incremental volume meter of FIGURE 3 may be removed from the respiration tract and monitoring and calibrated recording by the indirect method may proceed.

Since the minute volume signal generator 20 and its corresponding recorder channel 18 has a fixed and known gain, the described procedure for calibrating tidal volume also calibrates the minute volume in liters per minute per centimeter.

In FIGURE 2 the marker pulse signals are shown on both the inspiration and expiration portions of the tidal volume signal as they are actually recorded. When one pair of markers, such as the pair occurring during inspiration, is adjusted as explained above for a one centimeter ordinate separation, the other pair occurring during expiration should also be one centimeter apart if the respiration monitor is linear during both parts of the breathing cycle. This offers a convenient way of checking on the linearity of any monitor. If nonlinearity is observed in the illustrative monitor shown in FIGURE 1, such nonlinearity may be corrected simply by moving the electrodes slightly on the surface of the subject's body. Other types of monitors may require other remedial measures such as adjustment of potentiometers or other electrical adjustments.

The volume meter of FIGURE 3, it will be noted, operates symmetrically; that is, the first mark in a pair that it makes on the tidal volume graph will be at a given distance from the start of both inspiration and expiration. This results from the piston in the meter travelling some distance in both directions before a mark is made.

In a commercial embodiment of the invention, the volume meter such as shown in FIGURE 3 is provided with an external heating coil, not shown, which bears on the outer surface of metal cylinder 21 to heat the said cylinder sufficiently to prevent condensation of moisture on the internal surfaces of the meter. If condensate were to form, the increase in frictional loading, if great enough, would affect the accuracy of the meter.

In summary, a new respiration monitor calibrating system and meter has been described. Only a few breaths by the subject through the meter are needed during the calibration period. The meter is so constructed that it imposes no measurable burden on the breathing load of the subject that might affect the normal pattern of breathing. After calibration, the meter and system may be set aside and disregarded with the concomitant advantage of not having anything interfere with medical procedures in which the subject may be involved.

Although what is considered a preferred mode of practicing the invention has been described in sufficient detail to enable those versed in the art to reproduce it, it should be understood that the description is illustrative rather than limiting for the invention may be variously embodied and is to be limited only by interpretation of the claim which follow.

What is claimed:

1. A calibrating volume meter comprising:
   (a) an enclosure having individual passageways leading to its interior for connecting it in air-exchange communication with the respiratory tract of a subject and with the atmosphere, respectively,
   (b) a piston means adapted for being moved within the enclosure by pressure variations due to breathing by a subject,
   (c) a light beam source and a photosensor means spaced apart across the path of movement of the piston means,
   (d) said photosensor means being adapted to produce electric signal variations upon interruption and restoration of the light beam by the piston means at the beginning and end of a time interval during which the piston means is displaced by an amount equal to a predetermined increment of tidal volume by air that may pass through the meter,
   (e) electric pulse generating means connected to the photosensor means and adapted to produce a pair of voltage pulses which are each coincident with a signal variation by the photosensor means and correspond in time with the beginning and end of said interval,
   (f) a recorder means that includes a writing means and is adapted to display with respect to a scale the instantaneous amplitude of tidal volume in the ordinate direction relative to time in the abscissa direction,
   (g) an electric signal mixer the inputs of which are a tidal volume signal and the voltage pulses and the output of which is a composite signal that is delivered to the recorder means, the voltage pulses deflecting the writing means momentarily to mark the beginning and end of the interval and to define the ordinate difference that represents the incremental volume, and
   (h) means for adjusting the amplitude of the tidal volume signal until the ordinate difference over the same time interval as read on the scale represents a unit volume whereupon the tidal volume signal may be read in terms of the same volume units on the scale.

References Cited

UNITED STATES PATENTS

| 2,892,346 | 6/1959 | Sargent | 73—194 |
| 3,120,118 | 2/1964 | Boyle | 73—3 |
| 3,273,375 | 9/1966 | Howe | 73—3 |
| 3,344,667 | 10/1967 | Maltby | 73—239 |

DAVID SCHONBERG, *Primary Examiner.*

LOUIS R. PRINCE, *Examiner.*

N. B. SIEGEL, *Assistant Examiner.*